United States Patent [19]

Okabe et al.

[11] Patent Number: 5,599,467
[45] Date of Patent: Feb. 4, 1997

[54] ALUMINUM WELDMENT AND METHOD OF WELDING ALUMINUM WORKPIECES

[75] Inventors: Shinji Okabe; Takashi Iwasa; Takushi Irie, all of Saitama; Yuichi Furukawa; Ichiro Iwai, both of Tochigi, all of Japan

[73] Assignees: Honda Giken Kogyo Kabushiki Kaisha, Tokyo; Showa Aluminum Corporation, Osaka, both of Japan

[21] Appl. No.: 340,520

[22] Filed: Nov. 16, 1994

[30] Foreign Application Priority Data

Nov. 19, 1993 [JP] Japan .................. 5-290660
Dec. 28, 1993 [JP] Japan .................. 5-351886
Feb. 21, 1994 [JP] Japan .................. 6-022726

[51] Int. Cl.⁶ .................................. B23K 11/18
[52] U.S. Cl. ............................ 219/118; 219/85.14
[58] Field of Search .................. 219/85.14, 85.15, 219/117.1, 118

[56] References Cited

U.S. PATENT DOCUMENTS

| | | | |
|---|---|---|---|
| 3,214,564 | 10/1965 | Katzer et al. | 219/92 |
| 3,592,993 | 7/1971 | Bennett | 219/83 |
| 4,843,211 | 6/1989 | Martukanitz | 219/146.22 |
| 4,880,709 | 11/1989 | Holroyd et al. | 428/654 |
| 5,256,856 | 10/1993 | Takano et al. | 219/137 |

FOREIGN PATENT DOCUMENTS

| | | | |
|---|---|---|---|
| 112665 | 1/1969 | Denmark | 219/118 |
| 0127343 | 12/1984 | European Pat. Off. | |
| 0300962 | 1/1989 | European Pat. Off. | |
| 54-41550 | 12/1979 | Japan | |
| 59-26392 | 6/1984 | Japan | |
| 59-26393 | 6/1984 | Japan | |
| 63-278679 | 11/1988 | Japan | |
| 5-185245 | 7/1993 | Japan | 219/118 |

OTHER PUBLICATIONS

English language Abstract of JP56077358, G-1981.
English language abstract of 63-278679.

*Primary Examiner*—Teresa J. Walberg
*Assistant Examiner*—J. Pelham
*Attorney, Agent, or Firm*—Lyon & Lyon

[57] ABSTRACT

An aluminum weldment is produced by resistance-welding aluminum workpieces, and has a nugget formed between the aluminum workpieces which contains more magnesium than the base material of the aluminum workpieces. The nugget contains 5~17 wt % of magnesium which forms a solid solution with aluminum.

14 Claims, 2 Drawing Sheets

ALUMINUM WELDMENT AND METHOD OF WELDING ALUMINUM WORKPIECES

BACKGROUND OF THE INVENTION

1. Field of the Invention

The present invention relates to an aluminum weldment, i.e., a welded assembly of aluminum workpieces, and a method of welding such aluminum workpieces, specifically, a lap resistance welding method.

2. Description of the Prior Art

Resistance welding is a welding process in which electrodes of copper or the like are held in contact with workpieces and supply an electric current to regions of the workpieces that are to be welded while the workpieces are being pressed against each other, for raising the temperature of the workpiece regions due to resistive heating thereby to weld the workpiece regions.

Workpieces of aluminum produce a small amount of heat and diffuse generated heat to a large extent because they have a small specific resistance and a large thermal conductivity. To resistance-weld aluminum workpieces, it is necessary to supply a large welding current to the aluminum workpieces in order to generate an increased amount of heat. However, a large welding current causes the surfaces of the aluminum workpieces which contact the electrodes to produce a large amount of heat, which tends to form an alloy of copper and aluminum at the tip ends of the electrodes. The electrodes that are alloyed with aluminum have a reduced service life. Another problem is that the initial and running costs of the welding machine used are high as the welding machine needs to be large in capacity due to the large current requirement. The mechanical strength of the joined spot (hereinafter referred to as a "nugget") of the aluminum workpieces is liable to be lower than that of the base material. Particularly in spot welding, the mechanical strength of the nugget often drops to or below 60% of that of the base material. For this reason, an increased welding current is supplied to increase the joining area of aluminum workpieces, or an increased number of spots are produced to weld aluminum workpieces. However, increasing the welding current requires large-size and high-performance equipment, and increasing the number of spots results in an increased number of welding steps.

To solve the above problems, there has been proposed a resistance welding process which employs an insert of low electric conductivity that is interposed between joining surfaces of aluminum workpieces for a lower welding current requirement and a higher heating efficiency. One known insert comprises a thin film of zinc as disclosed in Japanese patent publication No. 54-41550. The thin film of zinc is interposed between regions of aluminum plates which are to be resistance-welded, and then instantaneously melted in a resistance welding process to produce a high-resistance area to concentrate electric energy thereon for thereby forming and separating a solid solution of aluminum and zinc in the nugget, which serves to increase the mechanical strength of the joined area. Japanese patent publication No. 59-26392 discloses an insert comprising a thin film of titanium to be interposed between aluminum workpieces to be welded, and Japanese patent publication No. 59-26393 discloses an insert comprising a thin film of stainless steel to be interposed between aluminum workpieces to be welded. It has also been proposed to employ an insert made of an alloy composed of 0.05 to 2.0 wt % of iron, 0.5 to 2.0 wt % of manganese, 0.7 wt % or less of magnesium, and a remainder of aluminum as disclosed in Japanese patent publication No. 63-278679.

However, none of the prior resistance welding processes have proven satisfactory as they have failed to meet demands for lower welding currents. Nuggets produced by the conventional resistance welding processes do not have a sufficient breaking strength, so that the joined regions may easily be peeled off when subjected to large external forces. For example, inserts in the form of thin films of zinc, titanium, and stainless steel fail to increase the mechanical strength of the nugget up to the mechanical strength of the base material, though they can increase the resistance locally. This is because the mechanical strength of a solid solution of zinc and aluminum is small as the difference between their lattice constants is small, and also because the effect of aluminum—titanium and aluminum—iron solid solutions is small due to very small limit amounts of titanium and iron, i.e., 0.15 wt % and 0.05 wt %, respectively, that are allowed to be added to form a solid solution with aluminum. In addition, an insert of zinc is disadvantageous in that the welded area has poor corrosion resistance. When an insert of titanium is used, the nugget is apt to become defective because some amount of titanium remains as an inclusion in the nugget.

SUMMARY OF THE INVENTION

It is therefore an object of the present invention to provide a welded assembly of aluminum workpieces, or an aluminum weldment, which has better corrosion resistance, is free of nugget defects, has increased nugget breaking strength, and can be welded with a reduced welding current.

Another object of the present invention is to provide a method of resistance-welding aluminum workpieces into an aluminum weldment having better corrosion resistance, free of nugget defects, and having increased nugget breaking strength, with a reduced welding current.

According to the present invention, there is provided an aluminum weldment comprising aluminum workpieces resistance-welded to each other and a nugget formed between the aluminum workpieces, the nugget containing more magnesium than a base material of the aluminum workpieces. The nugget contains 5 to 17 wt % of magnesium. The nugget may additionally contain 0.05 to 5 wt % of chromium, or 0.1 to 5 wt % of manganese, or more zinc than the base material of the aluminum workpieces.

Preferably, up to 17 wt % of magnesium should form a solid solution with aluminum in the nugget for increased breaking strength.

According to the present invention, there is also provided a method of resistance-welding a plurality of aluminum workpieces, comprising the steps of superposing the aluminum workpieces with an insert interposed between faying surfaces thereof, the insert being made of a material selected from the group consisting of magnesium, a magnesium alloy, and an aluminum—magnesium alloy containing 6 wt % or more of magnesium, and supplying a welding current through the aluminum workpieces and the insert.

According to the present invention, there is also provided a method of resistance-welding a plurality of aluminum workpieces, comprising the steps of superposing the aluminum workpieces with an insert interposed between faying surfaces thereof, the insert being made of a material selected from the group consisting of magnesium, a magnesium alloy, and an aluminum—magnesium alloy containing 6 wt % or more of magnesium, at least one of the insert and the aluminum workpieces containing at least one of 0.05~10 wt % of copper, 0.05~10 wt % of silicon, and 0.05~10 wt % of zinc, and supplying a welding current through the aluminum workpieces and the insert.

An aluminum weldment produced by the above methods has a nugget, and the nugget preferably contains 6~17 wt % of magnesium, and at least one of 0.05~10 wt % of copper, 0.05~10 wt % of silicon, and 0.05~10 wt % of zinc.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
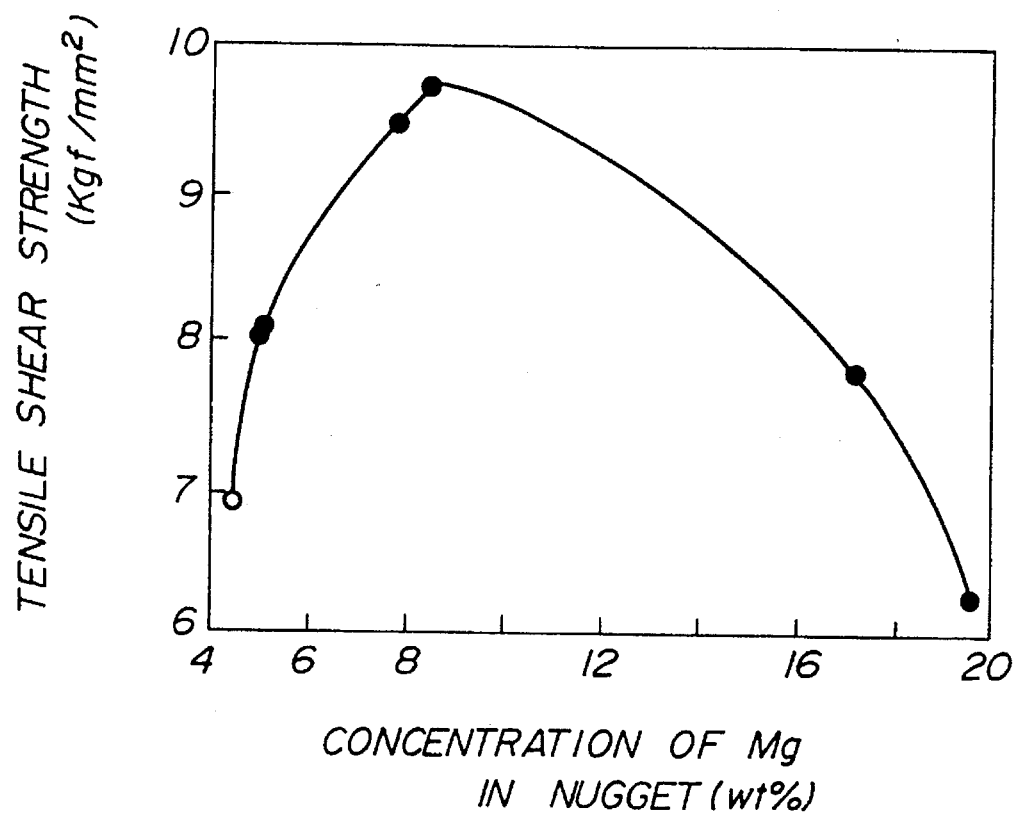
FIG. 1 is a graph showing the relationship between the concentration of magnesium in and the tensile shear strength of the nuggets of aluminum weldments which are produced by a method of resistance-welding aluminum workpieces according to a first embodiment of the present invention.

The principles of the present invention have been established on the basis of the inventors' finding that the limit amount of magnesium that is allowed to be added to form a solid solution with aluminum is so high that it is suitable for increasing the mechanical strength of a nugget, as a result of review of various welding processes.

Preferred embodiments of an aluminum weldment or a welded assembly of aluminum workpieces and a welding method according to the present invention will be described in detail below.

A first embodiment of the present invention has been achieved on the basis of the inventors' finding that the limit amount of magnesium that is allowed to be added to form a solid solution with aluminum is so high that it is suitable for increasing the mechanical strength of a nugget, as a result of review of various welding processes. More specifically, the first embodiment is based on the finding that a strong aluminum alloy weldment can be produced by having more magnesium contained in a nugget than in a base material.

Particularly, it is preferable that the nugget contain 5 to 17 wt % of magnesium therein. In addition, an aluminum weldment has a high mechanical strength if the nugget contains 0.05 to 5 wt % of chromium or 0.1 to 5 wt % of manganese. The mechanical strength of an aluminum weldment can also be increased by having more zinc as well as magnesium contained in the nugget than in the base material.

Magnesium or the like may be contained in the nugget by placing a powdery mixture mainly composed of magnesium powder between aluminum alloy workpieces to be welded, and then spot-welding the aluminum alloy workpieces.

Since up to 17 wt % of magnesium can be added to form a solid solution with aluminum, the effect of such a solid solution is large. The nugget can be strengthened if the content of magnesium in the nugget is 0.5 wt % larger than that in the base material. If the content of magnesium in the nugget exceeded 17 wt %, then the nugget would become brittle and its mechanical strength would be lowered because the amount of grain boundary crystallization of an intermetallic compound of aluminum and magnesium ($Al_3Mg_2$) would be excessive. Therefore, the content of magnesium should preferably be in the range of from 5 to 17 wt %.

When chromium and magnesium are contained in the nugget, since the crystallization of an intermetallic compound of aluminum and magnesium ($Al_3Mg_2$) is suppressed by preferential grain boundary crystallization of chromium, the mechanical strength of the solid solution is increased. The mechanical strength of the nugget is further increased because chromium itself is expected to increase the mechanical strength of the solid solution.

If the content of chromium were less than 0.5 wt % then the amount of crystallized chromium would be too small to increase the mechanical strength of the solid solution. If the content of chromium exceeded 5 wt %, then the amount of grain boundary crystallization of an intermetallic compound of aluminum and magnesium would be excessive, and the nugget would become brittle and its mechanical strength would be lowered. Therefore, the content of chromium should preferably be in the range of from 0.05 to 5 wt %.

When manganese and magnesium are contained in the nugget, since the crystallization of an intermetallic compound of aluminum and magnesium ($Al_3Mg_2$) is suppressed by preferential grain boundary crystallization of manganese, the mechanical strength of the solid solution is increased.

If the content of manganese were less than 0.1 wt %, then the amount of crystallized manganese would be too small to increase the mechanical strength of the solid solution. If the content of manganese exceeded 5 wt %, then the amount of grain boundary crystallization of an intermetallic compound of aluminum and magnesium would be excessive, and the nugget would become brittle and its mechanical strength would be lowered. Therefore, the content of manganese should preferably be in the range of from 0.1 to 5 wt %.

When magnesium and zinc are contained in the nugget, magnesium is effective in increasing the mechanical strength of the solid solution, and zinc is effective in increasing an welded area, resulting in an increased mechanical strength of the nugget.

Three experimental examples according to the first embodiment will be described below. The first embodiment should not be interpreted as being limited by these experimental examples.

EXPERIMENTAL EXAMPLE 1

(Inventive Examples 1~5 Comparative Examples 1, 2)

Workpieces to be welded (base material):
Material: Rolled Al-Mg aluminum alloy (A5182)
Thickness: 1.2 mm
Welding conditions:
Power supply: Inverter power supply
Current: 10 kA or 12 kA
Pressure: 400 kgf
Powdery mixture:
Coated amount: 0.03 g/cm$^2$ Composition: Mixture of magnesium powder (particle diameter of 300 μm or less) and aluminum powder (particle diameter of 150 μm or less)

The composition of the powdery mixture were varied in Inventive Examples 1~5, ("In.Ex.") with no powdery mixture contained in Comparative Example 1 ("Co.Ex."). The workpieces were spot-welded, the contents of magnesium in the produced nuggets, the joined areas, and the tensile shear loads were checked, and the tensile shear strengths were calculated. The results are given in Table 1 below. The tensile shear load is a tensile load applied when the joined surfaces are broken apart under shear stresses caused by a tensile load.

In Comparative Example 2, a powdery mixture composed of 40 wt % of Mg and the remainder of Al was interposed between the workpieces, and the welding current had a low value of 10 kA and the welding time was a short period of 5 cy. Mg in the nugget had a high content of 19.4 wt %, and the tensile shear strength had a lowest value of 6.3 kgf/mm$^2$. The evaluation of Comparative Example 2 was "x". It is presumed that since the content of Mg in the nugget exceeded 17 wt %, the amount of grain boundary crystallization of an intermetallic compound of aluminum and magnesium was excessive.

FIG. 1 shows the relationship between the concentration of magnesium in and the tensile shear strength of the nuggets

TABLE 1

Pressure: 400 kgf, Amount of powdery mixture: 0.03 g/cm$^2$, Tensile shear strength: 8 kgf/mm$^2$ or higher

| | Base material | Powdery mixture | Welding conditions | Nugget Mg wt % | Joined area mm$^2$ | (A) kgf | (B) kgf/mm$^2$ | (C) |
|---|---|---|---|---|---|---|---|---|
| Co. Ex. 1 | A5182 | None | 12 kA, 10 cy. | 4.5 | 16.0 | 111 | 6.9 | x |
| In. Ex. 1 | A5182 | 75 wt % Mg—Al | 12 kA, 10 cy. | 5.0 | 18.4 | 148 | 8.0 | o |
| In. Ex. 2 | A5182 | 75 wt % Mg—Al | 12 kA, 20 cy. | 5.1 | 26.9 | 218 | 8.1 | o |
| In. Ex. 3 | A5182 | 50 wt % Mg—Al | 12 kA, 10 cy. | 7.8 | 17.3 | 165 | 9.5 | o |
| In. Ex. 4 | A5182 | 50 wt % Mg—Al | 12 kA, 20 cy. | 8.4 | 24.8 | 243 | 9.8 | o |
| In. Ex. 5 | A5182 | 40 wt % Mg—Al | 12 kA, 10 cy. | 17.0 | 9.7 | 76 | 7.8 | Δ |
| Co. Ex. 2 | A5182 | 40 wt % Mg—Al | 12 kA, 5 cy. | 19.4 | 7.8 | 49 | 6.3 | x |

(A): Tensile shear load
(B): Tensile shear strength
(C): Evaluation

As shown in Table 1 above, the tensile shear strength of Comparative Example 1 based on a conventional welding process was 6.9 kgf/mm$^2$ and the evaluation of Comparative Example 1 was unacceptable "x" because as an evaluation point to be exceeded for the tensile shear strength was 8 kgf/mm$^2$.

In Inventive Examples 1~5, the workpieces were spot-welded with interposed powdery mixtures composed of 40~75 wt % of Mg and the remainder of Al. The tensile shear strengths of these Inventive Examples 1~5 were in excess of 8.0 kgf/mm$^2$, and their evaluation was acceptable "O".

according to the first embodiment of the present invention. The graph shown in FIG. 1 represents the data in Table 1 above.

As can be seen from Table 1 and FIG. 1, the best results can be obtained when the content of Mg in the nugget ranges from 5 to 17 wt %.

Table 2, given below, shows the results of Inventive Examples 6~10 and Comparative Examples 3~5 in which manganese and chromium were added to a powdery mixture of magnesium and aluminum. The workpieces were made of a base material of aluminum (A1050).

TABLE 2

Pressure: 400 kgf, Amount of powdery mixture: 0.03 g/cm$^2$, Tensile shear strength: 6.5 kgf/mm$^2$ or higher

| | Base material | Powdery mixture | (D) kA:cy | Nugget Mg wt % | Cr wt % | Mn wt % | Joined area mm$^2$ | (A) kgf | (B) kgf/mm$^2$ | (C) |
|---|---|---|---|---|---|---|---|---|---|---|
| Co. Ex. 3 | A1050 | None | 16:10 | 0.05 | 0 | 0.05 | 16.3 | 52 | 3.2 | x |
| In. Ex. 6 | A1050 | 50 Mg—Al | 16:10 | 4.2 | 0 | 0.05 | 18.2 | 118 | 6.5 | o |
| In. Ex. 7 | A1050 | 50 Mg—1 Mn—Al | 16:10 | 3.8 | 0 | 0.1 | 17.6 | 127 | 7.2 | o |
| In. Ex. 8 | A1050 | 50 Mg—10 Mn—Al | 16:10 | 2.5 | 0 | 5.0 | 16.5 | 111 | 6.7 | o |
| Co. Ex. 4 | A1050 | 50 Mg—10 Mn—Al | 16:5 | 3.2 | 0 | 5.7 | 12.8 | 74 | 5.8 | x |
| In. Ex. 9 | A1050 | 50 Mg—10 Mn—Al | 16:10 | 3.9 | 0.05 | 0.05 | 17.2 | 120 | 7.0 | o |
| In. Ex. 10 | A1050 | 50 Mg—12 Cr—Al | 16:5 | 3.5 | 5.00 | 0.05 | 18.1 | 130 | 7.2 | o |
| Co. Ex. 5 | A1050 | 50 Mg—10 Cr—Al | 16:5 | 4.0 | 6.00 | 0.05 | 17.5 | 105 | 6.0 | x |

(A): Tensile shear load
(B): Tensile shear strength
(C): Evaluation
(D): Welding conditions In Comparative Example 3, no powdery mixture was employed. The evaluation of Comparative Example 3 was "x".

Inventive Examples 6–8 and Comparative Example 4: In Inventive Examples 7, 8 and Comparative Example 4, manganese was added to a powdery mixture of magnesium and aluminum. The evaluation of Inventive Examples 7, 8 was "○". In comparative Example 4, the content of manganese exceeded 5 wt %, and the amount of grain boundary crystallization of an intermetallic compound of aluminum and magnesium was excessive, making the nugget brittle and low in mechanical strength. Therefore, the content of manganese should be 5 wt % or less.

Inventive Examples 9, 10 and Comparative Example 5: In Inventive Examples 9, 10 and Comparative Example 5, chromium was added to a powdery mixture of magnesium and aluminum. The evaluation of Inventive Examples 9, 10 was "○". In Comparative Example 5, the content of chromium exceeded 5 wt %, and the amount of grain boundary crystallization of an intermetallic compound of aluminum and magnesium was excessive, making the nugget brittle and low in mechanical strength. Therefore, the content of chromium should be 5 wt % or less.

Table 3, given below, shows the results of Inventive Examples 11–13 and Comparative Examples 6–9 in which zinc was added to a powdery mixture of magnesium and aluminum. The workpieces were made of a base material of aluminum (A5182).

weldment which contains more magnesium in the nugget than in the base material, the solid solution in the nugget is sufficiently strengthened, and the mechanical strength of the weldment is increased.

If the content of magnesium is 17 wt % or less, then since the amount of grain boundary crystallization of an intermetallic compound of aluminum and magnesium ($Al_3Mg_2$) can be suppressed, an aluminum weldment containing magnesium in the range of from 5 to 17 wt % has a sufficient mechanical strength.

In an aluminum weldment which contains 0.05~5 wt % of chromium as well as magnesium in the nugget, the crystallization of an intermetallic compound of aluminum and magnesium ($Al_3Mg_2$) is suppressed by preferential grain boundary crystallization of chromium, the mechanical strength of the solid solution is increased. The mechanical strength of the nugget is further increased because chromium itself is expected to increase the mechanical strength of the solid solution.

In an aluminum weldment which contains 0.1~5 wt % of manganese as well as magnesium in the nugget, the crystallization of an intermetallic compound of aluminum and magnesium ($Al_3Mg_2$) is suppressed by preferential grain boundary crystallization of manganese, the mechanical strength of the solid solution is increased.

In an aluminum weldment which contains magnesium and zinc in the nugget, magnesium is effective in increasing the mechanical strength of the solid solution, and zinc is effec-

TABLE 3

Pressure: 400 kgf, Amount of powdery mixture: 0.03 g/cm$^2$, Tensile shear strength: 9.0 kgf/mm$^2$ or higher

| | Base material | Powdery mixture | (D) kA:cy | Nugget | | | | | |
|---|---|---|---|---|---|---|---|---|---|
| | | | | Mg wt % | Zn wt % | Joined area mm$^2$ | (A) kgf | (B) kgf/mm$^2$ | (C) |
| Co. Ex. 6 | A5182 | None | 12:10 | 4.5 | 0.2 | 16.0 | 111.0 | 6.9 | x |
| Co. Ex. 7 | A5182 | 50 Mg—Al | 12:10 | 7.8 | 0.15 | 17.3 | 165.0 | 9.5 | o |
| Co. Ex. 8 | A5182 | 100 Zn | 12:4 | 3.7 | 18.0 | 22.5 | 158.0 | 7.0 | x |
| In. Ex. 11 | A5182 | 50 Mg—10 Zn—Al | 12:10 | 17.0 | 3.6 | 18.8 | 182.4 | 9.7 | o |
| In. Ex. 12 | A5182 | 50 Mg—30 Zn—Al | 12:10 | 15.0 | 9.2 | 21.6 | 229.0 | 10.6 | o |
| In. Ex. 13 | A5182 | 50 Mg—Zn | 12:10 | 14.5 | 14.3 | 24.8 | 267.8 | 10.8 | o |
| Co. Ex. 9 | A5182 | 50 Mg—Zn | 12:4 | 18.2 | 17.9 | 18.3 | 110.0 | 6.0 | x |

(A): Tensile shear load
(B): Tensile shear strength
(C): Evaluation
(D): Welding conditions In Comparative Example 6, no powdery mixture was employed. In Comparative Example 8, a powdery mixture of 100 of Zn was employed. The evaluation of Comparative Examples 6, 8 was "x". The evaluation of Comparative Example 7 which contained Mg was "○".

The evaluation of Inventive Examples 11–13 in which zinc was added to magnesium was "○". In Comparative Example 9, a similar powder of Mg and Zn was used, but the welding time was a short period of 4 cy. Since the concentration of Mg in the nugget was 18.2 wt % in excess of 17 wt %, the amount of grain boundary crystallization of an intermetallic compound of aluminum and magnesium was excessive, making the nugget brittle and low in mechanical strength. The evaluation of Comparative Example 9 was "x".

The first embodiment of the present invention is based on the fact that up to 17 wt % of magnesium can be added to form a solid solution with aluminum. In an aluminum tive in increasing an welded area, resulting in an increased mechanical strength of the nugget.

An aluminum weldment, i.e., a welded assembly of aluminum workpieces, and a method of welding such aluminum workpieces according to a second embodiment of the present invention will be described below.

In the second embodiment, a highly strong aluminum alloy is formed in the nugget of welded aluminum workpieces as with the first embodiment. The second embodiment is concerned with not only the composition of an insert, but also the composition of the workpieces to be welded. In the second embodiment, the composition of the workpieces to be welded is suitably selected to determine the composition of the nugget itself.

According to the second embodiment of the present invention, there is provided an aluminum weldment produced by resistance-welding aluminum workpieces with an insert interposed between the faying surfaces of the aluminum workpieces, the insert being made of magnesium, a magnesium alloy, or an aluminum—magnesium alloy containing 6 wt % or more of magnesium, and at least one of the insert or the aluminum workpieces containing at least one of 0.05~10 wt % of copper, 0.05~10 wt % of silicon, and 0.05~10 wt % of zinc. Furthermore, there is provided in accordance with the second embodiment of the present invention an aluminum weldment produced by resistance-welding two aluminum workpieces through a nugget, the nugget containing 6~17 wt % of magnesium, and at least one of 0.05~10 wt % of copper, 0.05~10 wt % of silicon, and 0.05~10 wt % of zinc.

The insert made of magnesium or a magnesium alloy is composed primarily of magnesium, and generally contains 50 wt % or more of magnesium. The aluminum—magnesium alloy containing 6 wt % or more of magnesium is an aluminum alloy which contains 6 wt % or more of magnesium.

The magnesium contained in the insert is combined with at least one of copper, silicon, and zinc contained in the aluminum workpieces or the insert, and serves to increase the breaking strength of the nugget of the welded aluminum workpieces. More specifically, when the aluminum workpieces are welded, the insert and the aluminum workpieces are welded and mixed at the faying surfaces, forming an alloy nugget. The nugget is thus made of an aluminum alloy containing magnesium and at least one of copper, silicon, and zinc, so that the nugget has increased mechanical strength and breaking strength. If the content of magnesium in the nugget were lower than 6 wt %, then it would be too small to increase the breaking strength of the nugget. The content of magnesium in the nugget should be at least 6 wt %, and preferably 10 wt % or more.

At least one of copper, silicon, and zinc may be contained in at least one of the aluminum workpieces and the insert because the material contained in at least one of the aluminum workpieces and the insert is effective to make the nugget of an alloy of high mechanical strength. If the content of any of copper, silicon, and zinc were below 0.05 wt %, it would be too small to increase the breaking strength of the nugget. Therefore, the lower limit of these elements should be 0.05 wt %. Preferably, the content of these elements should be 0.25 wt % or more, and more preferably 0.4 wt % or more. If the content of any of copper, silicon, and zinc exceeded 10 wt %, then the ductility and corrosion resistance would be lowered. Therefore, it is necessary that the upper limit of these elements be 10 wt %. Preferably, the content of these elements should be 8 wt % or less, and more preferably 6 wt % or less.

As described above, at least one of copper, silicon, and zinc may be contained in at least one of the aluminum workpieces and the insert. However, it is better for at least one of copper, silicon, and zinc to be contained in the workpieces because it can increase the mechanical strength of the welded workpieces. Of course, at least one of copper, silicon, and zinc may be contained in both the aluminum workpieces and the insert, or in one of the aluminum workpieces and the insert. If at least one of copper, silicon, and zinc is contained in both the aluminum workpieces and the insert, then it may be contained in the same combination and content, providing workpieces of the same kind, or it may be contained in different combinations and contents, providing workpieces of different kinds. The remaining composition of the workpieces other than copper, silicon, and zinc includes aluminum and unavoidable impurities. However, the workpieces may contain other elements than copper, silicon, and zinc insofar as they will not affect the welding performance. For example, 0.2~6 wt % of magnesium may be contained in the workpieces in order to increase the mechanical strength of the workpieces.

Using the workpieces and the insert described above, the nugget of the welded workpieces contains magnesium and at least one of 0.05~10 wt % of copper, 0.05~10 wt % of silicon, and 0.05~10 wt % of zinc. Preferably, the content of magnesium in the nugget should be in the range of 6~17 wt %. If the content of magnesium in the nugget were less than 6 wt %, then it would be too small to increase the breaking strength of the nugget. If the content of magnesium in the nugget were in excess of 17 wt %, then the nugget would become brittle and its breaking strength would not be increased. If the content of any of copper, silicon, and zinc in the nugget were below 0.05 wt %, it would be too small to increase the breaking strength of the nugget. Therefore, the lower limit of these elements should be 0.05 wt %. Preferably, the content of these elements should be 0.25 wt % or more, and more preferably 0.4 wt % or more. If the content of any of copper, silicon, and zinc in the nugget exceeded 10 wt % then the ductility and corrosion resistance would be lowered. Therefore, it is necessary that the upper limit of these elements in the nugget be 10 wt %. Preferably, the content of these elements should be 8 wt % or less, and more preferably 6 wt % or less. The sum of contents of at least one of copper, silicon, and zinc in the nugget should preferably be 20 wt % or less. The remaining composition of the nugget other than magnesium, copper, silicon, and zinc includes aluminum and unavoidable impurities. However, the workpieces may contain other elements than magnesium, copper, silicon, and zinc insofar as they will not affect the welding performance.

In the second embodiment, the insert is made of magnesium or a magnesium alloy in order to produce a nugget of an alloy of high mechanical strength, as described above. The insert made of magnesium or a magnesium alloy is also effective to reduce a welding current supplied in a resistance welding process, as described below.

When aluminum and magnesium are heated while they are held in contact with each other, they melt at their eutectic point rather than at their individual melting points. Specifically, in a resistance welding process, an insert of magnesium or a magnesium alloy is interposed between workpieces, and a welding current is passed through the workpieces and the insert. Since the insert melts at 437° C. which is lower than the melting point of aluminum, the amount of heat necessary to form a nugget may be small, and hence the welding current may be small. If an insert that is made of an aluminum—magnesium alloy containing 6 wt % or more of magnesium is used, then since the alloy can increase the electric resistance, the insert has higher heating efficiency, and hence is more effective.

In the second embodiment, therefore, an insert is made of magnesium, a magnesium alloy, or an aluminum—magnesium alloy containing 6 wt % or more of magnesium for lowering the melting point of the regions to be welded. Particularly, if an insert that is made of an aluminum—magnesium alloy is used, then it increases the electric resistance. Consequently, the welding current required in a resistance welding process is lowered, the heating efficiency of a resistance welding process is increased, and the nugget is made of an alloy of high mechanical strength. If the content of magnesium in an insert made of an aluminum—magnesium alloy were less than 6 wt %, the electric resistance would not be increased and the melting point would not be lowered. Therefore, the content of magnesium in an insert made of an aluminum—magnesium alloy should be 6 wt % or more, and preferably 15 wt % or more.

The insert is not limited to any shapes. The insert may be in the form of a thin sheet, a rod, a powdery mass, etc. In any case, the insert should have a thickness in the range of from 5 µm to 2 mm. If the thickness of the insert were less than 5 µm, then the concentration of magnesium in the melted nugget would be too low to make the nugget of an alloy of high mechanical strength, any reduction in the melting point would be small, any increase in the electric resistance would be small, and the welding current would not sufficiently be lowered. If the thickness of the insert were in excess of 2 mm, then separate nuggets would be formed in the faying surfaces of the insert held against the workpieces, lowering the heating efficiency, and only a small nugget would be produced. Preferably, the thickness of the insert should be in the range of from 20 to 500 µm.

If the insert is made of a powdery mass, then the particles of the powdery mass should have an average diameter ranging from 0.1 to 200 µm. If the average diameter were less than 0.1 µm, then since magnesium is easily oxidizable, the proportion of magnesium oxide (MgO) in the powdery mass would become too large. If the average diameter exceeded 200 µm, then the powdery mass could not be pressed into an insert, and it would be difficult to mix the powder with a binder. If the insert is made of a powdery mass, then the average diameter should preferably range from 1 to 50 µm.

Figure 2:
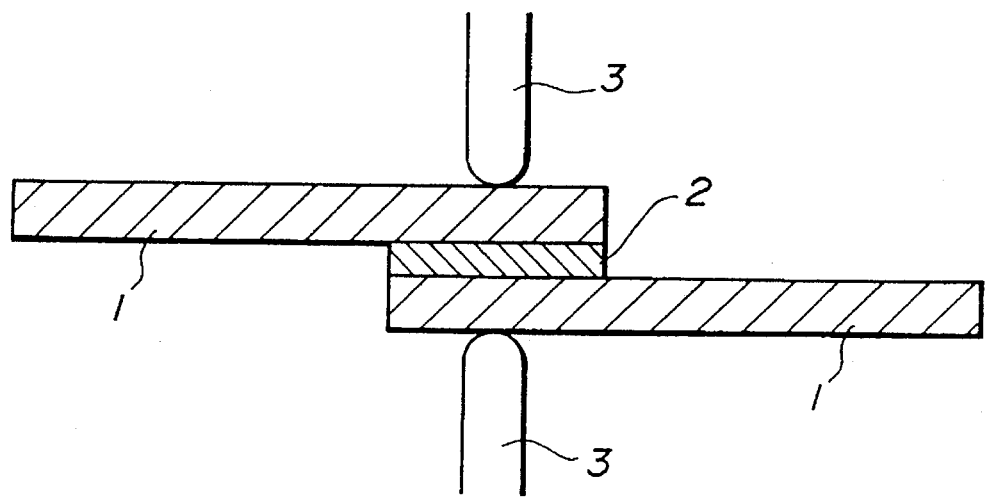
FIG. 2 is a schematic front elevational view, partly in cross section, of a welding apparatus which can be used to carry out welding methods according to various embodiments of the present invention.

A welding apparatus for resistance-welding aluminum workpieces is shown in FIG. 2. As shown in FIG. 2, an insert 2 is interposed between faying surfaces of workpieces 1. The welding apparatus can be used with respect to the first embodiment. If the insert 2 is made of a powdery mass, then it may be pressed into a sheet by a cold pressing process or may directly be coated on the faying surfaces. If the powder mass is pressed into a sheet by a cold pressing process, then it may be mixed with powder of aluminum, and the mixture may be pressed into a sheet. In such a case, the composition of the insert can freely be controlled. If the powdery mass is directly coated on the faying surfaces, it may be mixed with a binder or a solvent to retain a desired insert shape provided it is difficult to keep the powdery mass itself on the faying surfaces. The binder should preferably be made of a material which will not impair the weldability of the insert, and may be a polymethacrylic acid—dibutyl phthalate binder, a polyvinyl butyral—polyethylene glycol binder, an ethylene cellulose—methyl acetate binder, or a polyethylene dimethyl phthalate binder. The solvent, which is determined in combination with the binder used, should preferably be made of a material which can quickly be removed upon heating in the welding process, and may be an alcohol such as methanol, a ketone such as acetone, or a benzene such as benzene, toluene, or xylene. A combination of a polymethacrylic acid—dibutyl phthalate binder and an alcohol such as methanol is particularly preferable.

The insert may not necessarily be made separately from the workpieces. An insert layer may be integrally attached to one or both of the workpieces by cladding, plating, spraying, or the like in advance of the welding process. Alternatively, the insert may be bonded to the facing surfaces of the workpieces and then welded, as in a weldbonding process.

Turning back to FIG. 2, a pair of electrodes 3 is held against the respective outer surfaces of the workpieces 1 with the insert 2 interposed therebetween, and the electrodes 3 are pressed against the workpieces 1 in gripping relation to the insert 2. Then, a welding current is supplied between the electrodes 3. Magnesium or a magnesium alloy of which the insert 2 may be made has a low melting point, and an aluminum—magnesium alloy containing 6 wt % or more of magnesium of which the insert 2 may be made has a large electric resistance and a low melting point. Therefore, the insert 2 is heated and melted efficiently with a low welding current, and the faying surfaces of the workpieces 1 are melted and mixed with the melted insert 2. As a result, a nugget of large diameter made of an alloy containing magnesium and at least one of copper, silicon, and zinc, e.g., an alloy of aluminum, copper, and magnesium, an alloy of aluminum, silicon, and magnesium, or an alloy of aluminum, zinc, and magnesium, is formed between the faying surfaces of the workpieces 1, thereby producing a strong joint between the workpieces 1.

Figure 3A:
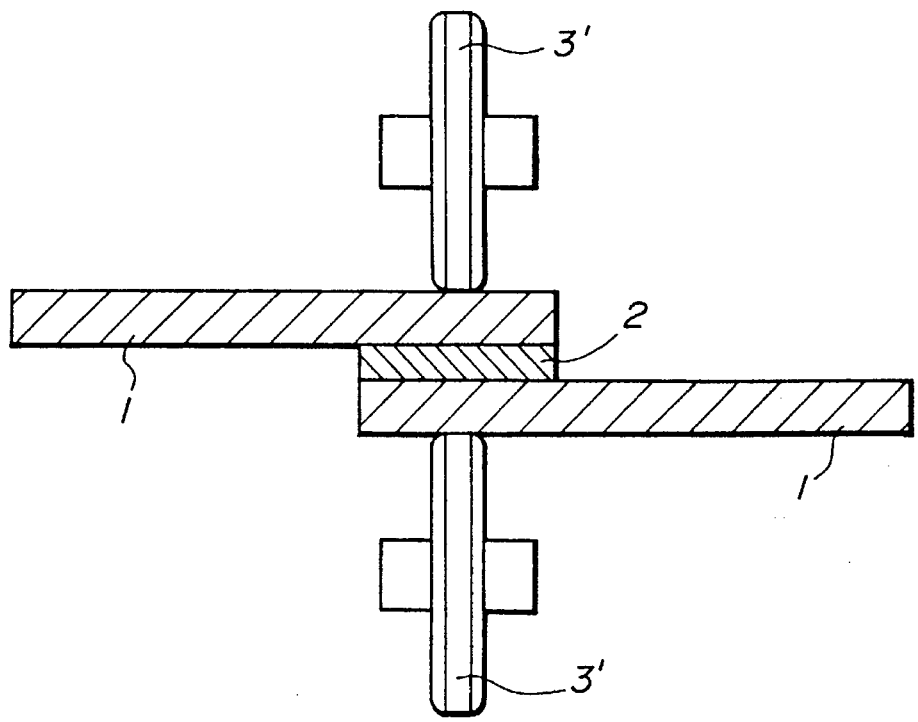
FIG. 3(a) is a schematic front elevational view, partly in cross section, of a modification of the welding apparatus shown in FIG. 2.
Figure 3B:
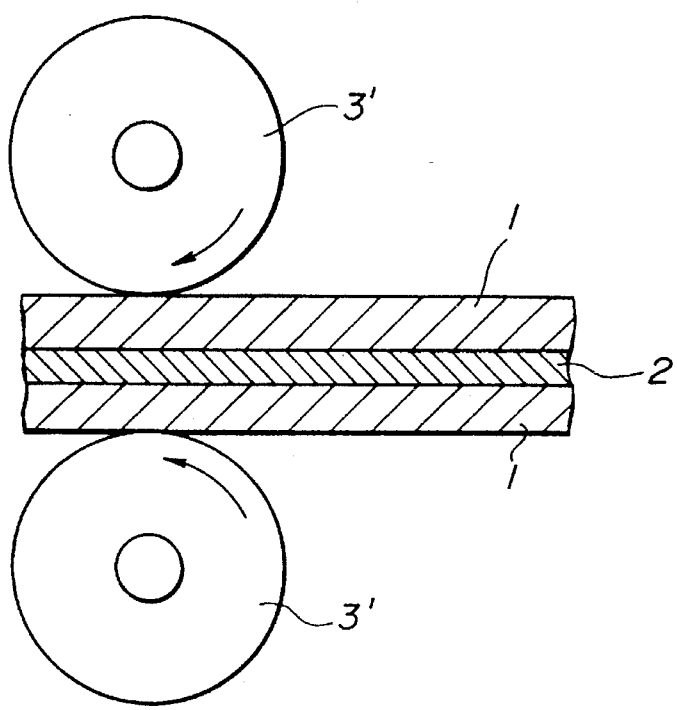
FIG. 3(b) is a schematic side elevational view, partly in cross section, of the modified welding apparatus shown in FIG. 3(a).

The resistance welding method according to the second embodiment may be applied to a spot welding process, or a welding process as shown in FIGS. 3(a) and 3(b), which is a modification of the welding apparatus shown in FIG. 2. In FIGS. 3(a) and 3(b), a pair of roller electrodes 3' is held against respective workpieces 1 with an insert 2 interposed therebetween. While the roller electrodes 3' are being simultaneously rotated in the directions indicated by the arrows (FIG. 3(b)) while in contact with the workpieces 1, or the workpieces 1 and the insert 2 are being moved in rolling contact with the roller electrodes 3' that are kept in position, a welding current is supplied between the roller electrodes 3' to continuously weld the faying surfaces of the workpieces 1.

In the second embodiment, when aluminum workpieces with an insert interposed therebetween are resistance-welded, the aluminum workpieces and the insert are melted and mixed at the faying surfaces of the aluminum workpieces, producing a nugget of large diameter made of an alloy containing magnesium and at least one of copper, silicon, and zinc. These elements contained in the alloy nugget are effective to increase the mechanical strength and breaking strength of the nugget. The breaking strength of the nugget is reliably increased when the nugget contains 6~17 wt % of magnesium, and at least one of 0.05~10 wt % of copper, 0.05~10 wt % of silicon, and 0.05~10 wt % of zinc.

Since magnesium is eutectic with respect to aluminum of which the workpieces are made, it is possible to lower the melting point of the regions to be welded, and hence the workpieces can melt efficiently with a low welding current. An alloy of aluminum and magnesium has a low melting point as well as an increased electric resistance achieved by magnesium, and hence is effective to melt the workpieces with a reduced amount of heat.

Two experimental examples according to the second embodiment will be described below.

EXPERIMENTAL EXAMPLE 1

Pairs of aluminum workpieces having various compositions as shown in Table 4 were prepared. Each of the workpieces had a length of 100 mm, a width of 30 mm, and a thickness of 1.0 mm.

Three types of inserts were prepared, i.e., inserts made of 100% of magnesium (type A), inserts made of 15 wt % of magnesium and the remainder of aluminum and unavoidable impurities (type B), and inserts made of 0.6 wt % of magnesium, 1.5 wt % of manganese, 0.8 wt % of iron, and the remainder of aluminum and unavoidable impurities (type C). Each of the inserts had a length of 10 mm, a width of 10 mm, and a thickness of 0.5 mm.

Two workpieces of each pair were superposed with an insert interposed between their laying surfaces, and then resistance-welded with a single-phase rectified resistance spot welding machine under welding conditions including a welding current of 10 kA, a voltage of 30 V, an electrode pressure of 400 kgf, an electrode diameter of 19 mm, and a welding time of 0.2 second.

After the workpieces were welded, the breaking strengths of the welded regions were measured. The diameters of the nuggets in the welded regions of Specimens Nos. 8 and 18 were also measured. The results are given in Table 4 below.

TABLE 4

| Speci-men No. | Composition of workpieces (wt %) | | | | In-sert types | Breaking strength (kgf) | Nugget diameter (mm) |
| --- | --- | --- | --- | --- | --- | --- | --- |
| | Cu | Si | Zn | Al | | | |
| 1 | 2 | 0.02 | 0.01 | Remainder | A | 160 | — |
| 2 | 6 | 0.02 | 0.01 | Remainder | A | 190 | — |
| 3 | 9 | 0.02 | 0.01 | Remainder | A | 190 | — |
| 4 | 0.02 | 1 | 0.01 | Remainder | A | 170 | — |
| 5 | 0.02 | 5 | 0.01 | Remainder | A | 170 | — |
| 6 | 0.02 | 8 | 0.01 | Remainder | A | 180 | — |
| 7 | 0.02 | 0.02 | 2 | Remainder | A | 190 | — |
| 8 | 0.02 | 0.02 | 6 | Remainder | A | 210 | 6.0 |
| 9 | 0.02 | 0.02 | 9 | Remainder | A | 240 | — |
| 10 | 5 | 5 | 0.01 | Remainder | A | 220 | — |
| 11 | 6 | 0.02 | 6 | Remainder | A | 240 | — |
| 12 | 0.02 | 6 | 5 | Remainder | A | 230 | — |
| 13 | 5 | 5 | 5 | Remainder | A | 230 | — |
| 14 | 6 | 0.02 | 0.01 | Remainder | B | 170 | — |
| 15 | 0.02 | 5 | 0.01 | Remainder | B | 180 | — |
| 16 | 0.02 | 0.02 | 6 | Remainder | B | 200 | — |
| 17 | 0.02 | 0.02 | 0.01 | Remainder | A | 120 | — |
| 18 | 0.02 | 0.02 | 6 | Remainder | C | 140 | 2.0 |

Insert type A: 100 wt % of magnesium;
Insert type B: aluminum and 15 wt % of magnesium;
Insert type C: aluminum, 0.6 wt % of magnesium, 1.5 wt % of manganese, 0.8 wt % of iron.
Specimen Nos. 1~16 are Inventive Examples, and Specimen Nos. 17 and 18 are Comparative Examples.

Comparison of Specimen Nos. 8 and 18 indicates that though the welding current therefor was the same, i.e., 10 kA, the Inventive Example No. 8 had a larger nugget diameter, a greater breaking strength, and a stronger bonding strength than the Comparative Example No. 18. Therefore, when the insert is made of magnesium, a magnesium alloy, or an aluminum —magnesium alloy containing 6 wt % or more of magnesium, a welding current required to obtain the same nugget diameter is smaller.

The workpieces having the compositions indicated in Specimen Nos. 1~17 shown in Table 4 were superposed and resistance-welded under the same conditions as those described above without using any insert therebetween. However, it was unable to join any of those workpieces.

EXPERIMENTAL EXAMPLE 2

Workpieces made of an aluminum alloy A5182 and each having a length of 100 mm, a width of 30 mm, and a thickness of 1.2 mm were prepared, and inserts having compositions indicated at Specimen Nos. 20~24 in Table 5, below, were prepared.

Two workpieces were superposed with an insert interposed between their faying surfaces (Specimen Nos. 20~24) or without any insert interposed between their faying surfaces (Specimen No. 19), and then resistance-welded with an inverter-type resistance welding machine under welding conditions including a welding current of 12 kA, 10 cycles, an electrode pressure of 400 kgf, and electrodes of OFCU (oxygen-free copper). The quantity alloys in the of inserts is shown in Table 5. After the workpieces were welded, the nuggets were checked for their composition, and the welded regions were measured for their breaking strength. The results are also given in Table 5.

TABLE 5

| Speci-men No. | Composition of nuggets (wt %) | | | | | Composition of inserts | Quantity of inserts (g/cm²) | Breaking strength (kgf) |
| --- | --- | --- | --- | --- | --- | --- | --- | --- |
| | Mg | Cu | Si | Zn | Al | | | |
| 19 | 4.5 | 0.05 | 0.1 | 0.05 | Remainder | None | 0.03 | 111 |
| 20 | 7.8 | 0.05 | 0.1 | 0.05 | Remainder | Al—50 wt % Mg | 0.03 | 165 |
| 21 | 7.2 | 3.2 | 0.1 | 0.05 | Remainder | Al—60 wt % Mg—10 wt % Cu | 0.03 | 198 |
| 22 | 7.3 | 0.05 | 2.8 | 0.05 | Remainder | Al—60 wt % Mg—10 wt % Si | 0.03 | 179 |
| 23 | 6.8 | 0.05 | 0.1 | 2.3 | Remainder | Al—60 wt % Mg—10 wt % Zn | 0.03 | 192 |
| 24 | 6.5 | 2.8 | 0.1 | 2.1 | Remainder | Al—50 wt % Mg—5 wt % Cu—5 wt % Zn | 0.03 | 202 |

Specimen No. 19 is a Comparative Example, and Specimen Nos. 20~24 are Inventive Examples.

It can be seen from Table 4 that the Inventive Examples have a greater breaking strength than the Comparative Example (No. 17) in which the workpieces were made of pure aluminum, because an alloy of aluminum, copper, and magnesium, or aluminum, silicon, and magnesium, or aluminum, zinc, and manganese was formed in the nugget. The weldments produced from workpieces containing aluminum and copper and workpieces containing aluminum and silicon were heated at 170° C. for 10 hours and then measured for breaking strength, and the weldments produced from workpieces containing aluminum and zinc were heated at 120° C. for 10 hours and then measured for breaking strength. In these weldments, it was found that the breaking strength increased 10~15 kgf.

It can be seen from Table 5 that the breaking strength can be increased by adding at least one of copper, silicon, and zinc to the insert, and that the weldment has a large breaking strength when the nugget contains 6~17 wt % of magnesium, and at least one of 0.05~10 wt % of copper, 0.05~10 wt % of silicon, and 0.05~10 wt % of zinc.

In the second embodiment, as described above, aluminum workpieces with an insert interposed between the faying surfaces of the aluminum workpieces are resistance-welded, the insert being made of magnesium, a magnesium alloy, or an aluminum—magnesium alloy containing 6 wt % or more of magnesium, and at least one of the insert or the aluminum workpieces containing at least one of 0.05~10 wt % of copper, 0.05~10 wt % of silicon, and 0.05~10 wt % of zinc. Therefore, when the workpieces are resistance-welded, the inserts and the workpieces are melted and mixed at the faying surfaces, producing a nugget of large diameter made of an alloy containing magnesium and at least one of copper, silicon, and zinc, e.g., an alloy of aluminum, copper, and magnesium, an alloy of aluminum, silicon, and magnesium, or an alloy of aluminum, zinc, and magnesium, between the faying surfaces of the workpieces. These elements are effective in increasing the mechanical strength and breaking strength of the nugget.

In addition, since magnesium contained in the insert is eutectic with respect to aluminum, it is possible to lower the melting point of the regions to be welded, and hence the workpieces can melt with a low welding current. If the insert is made of an alloy of aluminum and magnesium, it has a low melting point as well as an increased electric resistance achieved by magnesium. Therefore, the workpieces can be melted with a reduced amount of heat. As a result, a large amount of heat can be produced and a large amount of workpiece material can be melted with a small welding current. Alloying of copper and aluminum at the tip ends of the electrodes at the time a large welding current is supplied can be suppressed, allowing the electrodes to have a long service life. Because a large-capacity welding machine is not required, the initial and running costs can be lowered.

Inasmuch as titanium does not exist as an inclusion in the nugget, which would be the case if an insert containing titanium were used, the welded regions are prevented from being defective, and the resultant weldment has high joint reliability.

In the case where the nugget contains 6~17 wt % of magnesium, and at least one of 0.05~10 wt % of copper, 0.05~10 wt % of silicon, and 0.05~10 wt % of zinc, the produced weldment has an increased breaking strength.

An aluminum weldment, i.e., a welded assembly of aluminum workpieces, and a method of welding such aluminum workpieces according to a third embodiment of the present invention will be described below.

In the third embodiment, an insert is made of a metal containing magnesium, more specifically, contains magnesium, a magnesium alloy, or an aluminum—magnesium alloy containing 6 wt % or more of magnesium, as with the second embodiment, in order to provide a method of resistance-welding aluminum workpieces with a reduced welding current without causing defects with the conventional resistance welding process, i.e., low corrosion resistance and nugget defects which would be produced if an insert containing zinc or titanium were used. In the third embodiment, an aluminum alloy of high mechanical strength is formed in the nugget of the welded workpieces as with the first embodiment. The third embodiment is directed to only the composition of the insert to define the composition of the nugget itself.

According to the third embodiment of the present invention, there is provided a method of resistance-welding aluminum workpieces with an insert interposed between the faying surfaces of the aluminum workpieces, the insert being made of magnesium, a magnesium alloy, or an aluminum—magnesium alloy containing 6 wt % or more of magnesium.

The aluminum of the workpieces differs from the aluminum used in the second embodiment, but is not limited to any composition. For example, it may be any of aluminums in the 5000s, such as 5182, 5052, or the like, or any of aluminums in the 6000s, such as 6061, 6063, 6N01, or the like, or may be any of various other compositions. The workpieces to be welded to each other may be of the same aluminum material or different aluminum materials.

As with the second embodiment, the insert made of magnesium or a magnesium alloy is composed primarily of magnesium, and generally contains 50 wt % or more of magnesium. The aluminum—magnesium alloy containing 6 wt % or more of magnesium is an aluminum alloy which contains 6 wt % or more of magnesium and the remainder of aluminum. However, the aluminum—magnesium alloy may contain other elements than magnesium insofar as they will not affect the welding performance.

In the third embodiment, the insert is made of magnesium, a magnesium alloy, or an aluminum—magnesium alloy containing 6 wt % or more of magnesium for the same reasons as in the second embodiment. When aluminum and magnesium are heated while they are held in contact with each other, they melt at their eutectic point rather than at their individual melting points. Specifically, in a resistance welding process, an insert of magnesium or a magnesium alloy is interposed between workpieces, and a welding current is passed through the workpieces and the insert. Since the insert melts at 437° C. which is lower than the melting point of aluminum, the amount of heat necessary to form a nugget may be small, and hence the welding current may be small. If an insert that is made of an aluminum—magnesium alloy containing 6 wt % or more of magnesium is used, then since the alloy can increase the electric resistance, the insert has higher heating efficiency, and hence is more effective.

In the third embodiment, therefore, an insert is made of magnesium, a magnesium alloy, or an aluminum—magnesium alloy containing 6 wt % or more of magnesium for lowering the melting point of the regions to be welded. Particularly, if an insert that is made of an aluminum—magnesium alloy is used, then it increases the electric resistance. Consequently, the welding current required in by a resistance welding process is lowered, and the heating efficiency of a resistance welding process is increased. If the content of magnesium in an insert made of an aluminum—magnesium alloy were less than 6 wt %, the electric resistance would not be increased and the melting point would not be lowered. Therefore, the content of magnesium in an insert made of an aluminum—magnesium alloy should be 6 wt % or more, and preferably 15 wt % or more.

The insert is not limited to any shapes. The insert may be in the form of a thin sheet, a rod, a powdery mass, etc. In any case, the insert should have a thickness in the range of from 5 μm to 2 mm. Preferably, the thickness of the insert should be in the range of from 20 to 500 μm for the same reasons as those given in the second embodiment.

If the insert is made of a powdery mass, then the particles of the powdery mass should have an average diameter ranging from 0.1 to 200 μm, preferably from 1 to 50 μm, for the same reasons as those given in the second embodiment.

In the third embodiment, the workpieces may be welded by the apparatus shown in FIG. 2 or FIGS. 3(a) and 3(b) as in the second embodiment. If the insert 2 is made of a powdery mass, then it may be pressed into a sheet by a cold pressing process or may directly be coated on the faying surfaces. If the powder mass is pressed into a sheet by a cold pressing process, then it may be mixed with powder of aluminum, and the mixture may be pressed into a sheet. In such a case, the composition of the insert can freely be controlled. If the powdery mass is directly coated on the faying surfaces, it may be mixed with a binder or a solvent to retain a desired insert shape provided it is difficult to keep the powdery mass itself on the faying surfaces. The binder and the solvent may be the same as those in the second embodiment.

The insert may not necessarily be made separately from the workpieces. An insert layer may be integrally attached to one or both of the workpieces by cladding, plating, spraying, or the like in advance of the welding process. Alternatively, the insert may be bonded to the facing surfaces of the workpieces and then welded, as in a weldbonding process.

Since magnesium is eutectic with respect to aluminum of which the workpieces are made, it is possible to lower the melting point of the regions to be welded, and hence the workpieces can melt efficiently with a low welding current. An alloy of aluminum and magnesium has a low melting point, and hence is effective to melt the workpieces with a reduced amount of heat.

Experimental examples according to the third embodiment will be described below.

INVENTIVE EXAMPLE 1

Two sheet-like workpieces of aluminum A5182, each having a length of 100 mm, a width of 30 mm, and a thickness of 1.0 mm, were superposed with a thin insert sheet of magnesium having a purity of 99.5% and a thickness of 0.2 mm being interposed between their faying surfaces, and then spot-welded with a single-phase AC resistance spot welding machine under welding conditions including a welding current of 10 kA, a frequency of 60 Hz, a welding time of 5 cycles, a round electrode tip having a radius of curvature of 75 mm, and an electrode pressure of 400 kgf.

INVENTIVE EXAMPLE 2

Workpieces were spot-welded in the same manner as Inventive Example 1 except that the insert was a thin sheet of an aluminum—magnesium alloy containing 15 wt % of magnesium and the remainder of aluminum and unavoidable impurities and having a thickness of 0.5 mm.

INVENTIVE EXAMPLE 3

Workpieces were spot-welded in the same manner as Inventive Example 1 except that the insert was a thin sheet of an aluminum—magnesium alloy containing 10 wt % of magnesium and the remainder of aluminum and unavoidable impurities and having a thickness of 0.3 mm.

INVENTIVE EXAMPLE 4

Workpieces were spot-welded in the same manner as Inventive Example 1 except that the insert was a powdery mass of magnesium having a purity of 99.5% with an average diameter of 40μm and coated to a thickness of 0.1 mm.

INVENTIVE EXAMPLE 5

Workpieces were spot-welded in the same manner as Inventive Example 1 except that the insert was a powdery mass of an aluminum—magnesium alloy containing 20 wt % of magnesium and the remainder of aluminum and unavoidable impurities and having an average diameter of 20 μm and coated to a thickness of 0.15 mm.

INVENTIVE EXAMPLE 6

Workpieces were spot-welded in the same manner as Inventive Example 1 except that the insert was a powdery mass of magnesium having a purity of 99.5% with an average diameter of 40 μm and pressed to a circular shape having a diameter of 10 mm under a pressure of 400 kgf by a press.

COMPARATIVE EXAMPLE 1

Workpieces were spot-welded in the same manner as Inventive Example 1 except that the insert was a thin sheet of aluminum containing 0.6 wt % of magnesium, 1.5 wt % of manganese, 0.8 wt % of iron, and the remainder of aluminum and unavoidable impurities and having a thickness of 0.5 mm.

COMPARATIVE EXAMPLE 2

Workpieces were spot-welded in the same manner as Inventive Example 1 except that the workpieces were directly superposed with no insert interposed therebetween.

The eight weldments thus produced were checked for nugget diameters and tensile shear strengths. The results are given in Table 6 below.

TABLE 6

| Specimen No. | Nugget diameter (mm) | Tensile load (kgf) |
|---|---|---|
| Inventive Example 1 | 4.5 | 200 |
| Inventive Example 2 | 4.5 | 185 |
| Inventive Example 3 | 4.5 | 200 |
| Inventive Example 4 | 5.0 | 215 |
| Inventive Example 5 | 5.0 | 215 |
| Inventive Example 6 | 5.5 | 220 |
| Comparative Example 1 | 2.0 | 100 |
| Comparative Example 2 | 2.0 | 80 |

It can be understood from Table 6 that though the welding current was the same, i.e., 10 kA, the Inventive Examples had a larger nugget diameter, a greater breaking strength, and a stronger bonding strength than the Comparative Examples. Therefore, a welding current required to obtain the same nugget diameter is smaller according to the third embodiment.

The third embodiment thus offers substantially the same advantages as those of the second embodiment. Specifically, aluminum workpieces with an insert interposed between the faying surfaces of the aluminum workpieces are resistance-welded, the insert being made of magnesium, a magnesium alloy, or an aluminum—magnesium alloy containing 6 wt % or more of magnesium. Since magnesium is eutectic with respect to aluminum, it is possible to lower the melting point of the regions to be welded, and hence the workpieces can melt efficiently with a low welding current. If the insert is made of an alloy of aluminum and magnesium, the alloy has a low melting point as well as an increased electric resistance achieved by magnesium, and hence is effective to melt the workpieces with a reduced amount of heat. As a result, a large amount of heat can be produced and a large amount of workpiece material can be melted with a small welding current. Alloying of copper and aluminum at the tip ends of the electrodes at the time a large welding current is supplied can be suppressed, allowing the electrodes to have a long service life. Because a large-capacity welding machine is not required, the initial and running costs can be lowered.

The welded regions have good corrosion resistance as no insert containing zinc is employed.

Magnesium or an aluminum—magnesium alloy of the insert is melted and alloyed with the base material of aluminum. Inasmuch as titanium does not exist as an inclusion in the nugget, which would be the case if an insert containing titanium were used, the welded regions are prevented from being defective, and the resultant weldment has high joint reliability.

If the insert has a thickness ranging from 5 μm to 2 mm, the above advantages of the insert are produced more effectively, resulting in stabilization of the quality of the welded regions.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An aluminum weldment comprising aluminum workpieces resistance-welded to each other and a nugget formed between said aluminum workpieces, said nugget containing 7 to 17 wt % of magnesium and said nugget containing more magnesium than the base material of the aluminum workpieces.

2. An aluminum weldment according to claim 1, wherein said nugget additionally contains 0.05 to 5 wt % of chromium.

3. An aluminum weldment according to claim 1, wherein said nugget additionally contains 0.1 to 5 wt % of manganese.

4. An aluminum weldment according to claim 1, wherein said nugget contains more zinc than the base material of the aluminum workpieces.

5. An aluminum weldment according to claim 1, wherein up to 17 wt % of magnesium forms a solid solution with aluminum in said nugget.

6. A method of resistance-welding a plurality of aluminum workpieces, comprising the steps of:
   superposing the aluminum workpieces with an insert interposed between faying surfaces thereof, said insert being made of a material selected from the group consisting of magnesium, a magnesium alloy; and an aluminum-magnesium alloy containing 40 wt % or more of magnesium; and
   supplying a welding current through said aluminum workpieces and said insert.

7. A method according to claim 6, wherein said insert has a thickness ranging from 5 μm to 2 mm.

8. A method of resistance-welding a plurality of aluminum workpieces, comprising the steps of:
   superposing the aluminum workpieces; and
   supplying a welding current through said aluminum workpieces to form a nugget therebetween, said nugget containing 6~17 wt % of magnesium, and at least one of 0.05~10 wt % of copper, 0.05~10 wt % of silicon, and 0.05~10 wt % of zinc.

9. A method of resistance-welding a plurality of aluminum workpieces, comprising the steps of:
   superposing the aluminum workpieces with an insert interposed between faying surfaces thereof, said insert being made of a material selected from the group consisting of magnesium, a magnesium alloy, and an aluminum—magnesium alloy containing 15 wt % or more of magnesium, at least one of said insert and said aluminum workpieces containing at least one of 0.05~10 wt % of copper, 0.05~10 wt % of silicon, and 0.05~10 wt % of zinc; and
   supplying a welding current through said aluminum workpieces and said insert.

10. A method according to claim 9, wherein said insert has a thickness ranging from 5 μm to 2 mm.

11. An aluminum weldment according to claim 1, wherein said nugget is comprised of an effective amount of grain boundary crystallization of an intermetallic compound of aluminum and magnesium for retaining tensile shear strength.

12. An aluminum weldment according to claim 1, wherein said nugget is comprised of metal melted during the resistance welding from a metal insert positioned between the aluminum workpieces and the aluminum of the aluminum workpieces.

13. An aluminum weldment according to claim 12, wherein said metal insert is of a metal selected from the group of magnesium, a magnesium alloy and an aluminum-magnesium alloy.

14. An aluminum weldment according to claim 13, wherein at least one of said metal insert and aluminum workpieces contains at least one of 0.05–10 wt. % of copper, 0.05–10 wt. % of silicon, and 0.05–10 wt. % of zinc.

* * * * *

UNITED STATES PATENT AND TRADEMARK OFFICE
CERTIFICATE OF CORRECTION

PATENT NO. : 5,599,467

DATED : February 4, 1997

INVENTOR(S) : Shinji OKABE; Takashi ISWASA; Takushi IRIE; Yuichi Furukawa; Ichiro IWAI It is certified that error appears in the above-identified patent and that said Letters Patent is hereby corrected as shown below:

Column 5, Table 1, under "Welding Conditions" section of the table, the last two lines should read: --10kA, 10 cy.-- and --10kA, 5 cy.--

Column 14, line 31, insert --of-- before "alloys" and delete "of" after the word "the".

Column 19, line 21, change the number "7" to --6--.

Signed and Sealed this

Fifteenth Day of December, 1998

Attest:

BRUCE LEHMAN

*Attesting Officer*　　　*Commissioner of Patents and Trademarks*